United States Patent [19]

Fukudomi

[11] Patent Number: 5,220,805
[45] Date of Patent: Jun. 22, 1993

[54] AIR-CONDITIONING SYSTEM FOR VEHICLE

[75] Inventor: Hisao Fukudomi, Hiroshima, Japan

[73] Assignee: Mazda Motor Corporation, Hiroshima, Japan

[21] Appl. No.: 953,134

[22] Filed: Sep. 29, 1992

[30] Foreign Application Priority Data

Sep. 30, 1991 [JP] Japan ................. 3-278561

[51] Int. Cl.⁵ ........................... F25D 29/00
[52] U.S. Cl. ........................ 62/126; 62/163; 62/244; 165/42; 236/94
[58] Field of Search .......... 62/161, 163, 164, 125, 62/126, 127, 244, 131; 236/94; 165/11.1, 42, 43

[56] References Cited

U.S. PATENT DOCUMENTS

| | | | |
|---|---|---|---|
| 4,442,885 | 4/1984 | Matsuzaki | 62/163 X |
| 4,617,986 | 10/1986 | Kobayashi et al. | 62/244 X |
| 4,966,011 | 10/1990 | Iida | 62/244 X |
| 5,152,335 | 10/1992 | Doi et al. | 165/42 X |

FOREIGN PATENT DOCUMENTS

328009 3/1991 Japan .

Primary Examiner—Harry B. Tanner
Attorney, Agent, or Firm—Sixbey, Friedman, Leedom & Ferguson

[57] ABSTRACT

An air-conditioning system operates in an automatic control mode when an auto-switch is on. When a rotary member which is manually rotated to set one air-conditioning factor is rotated while the auto-switch is on, the air-conditioning system operates in a manual control mode as far as the one air-conditioning factor. The rotary member can be rotated endlessly. When the rotary member is rotated from one angular position to another when the air-conditioning system is operating in the automatic control mode, the one air-conditioning factor is set to a mode or a value which is determined on the basis of the amount of rotation and the mode or the value to which it had been set when the rotary member was in the one angular position.

5 Claims, 7 Drawing Sheets

AIR-CONDITIONING SYSTEM FOR VEHICLE

BACKGROUND OF THE INVENTION

1. Field of the Invention

This invention relates to an air-conditioning system for a vehicle.

2. Description of the Prior Art

As disclosed, for instance, in Japanese Unexamined Patent Publication No. 3(1991)-28009, there has been known an air-conditioning system for a vehicle which operates either in an automatic control mode in which a control means automatically sets a plurality of air-conditioning factors such as the speed of the blower motor, the blow mode and the like and controls the air-conditioning system according to the air-conditioning factors automatically set, or in a manual control mode in which the air-conditioning factors are manually set and the control means controls the air-conditioning system according to the air-conditioning factors which are manually set. The air-conditioning system has a rotary control member which is rotated between a plurality of angular positions to set one of the air-conditioning factors to a desired value or a desired mode. A plurality of signs representing values or modes of said one air-conditioning factor are provided about the rotary control member and a mark such as an arrow is provided on the rotary control member. By rotating the rotary control member and setting the arrow at one of the signs corresponding to a desired mode or a value of said one air-conditioning factor when the air-conditioning system is operating in the manual control mode, said one air-conditioning factor is manually set to the desired mode or the desired value and the mode or the value thus selected is indicated by a telltale. When the rotary control member is rotated when the air-conditioning system is operating in the automatic control mode, the control is shifted to the manual control mode as far as said one air-conditioning factor.

In such a known air-conditioning system, there have been the following problems. That is, when the auto-switch is turned on and the control is shifted to the automatic control mode while the air-conditioning system is operating in the manual control mode, said one air-conditioning factor is automatically set to a value or a mode which is determined according to the operating condition of the air-conditioning system such as the temperature in the interior of the vehicle, the temperature outside the vehicle, the solar radiation entering the vehicle interior and the like, and the telltale corresponding to the value or the mode is lit independently from the angular position of the rotary control member. When the value or the mode at which the arrow on the rotary control member has been set differs from that indicated by the telltale, the driver will get embarrassed. Further when the rotary control member is rotated to change the value or the mode of said one air-conditioning factor while the air-conditioning system is operating in the automatic control mode, said one air-conditioning factor can be changed unexpectedly when the rotary control member is in an angular position indicated by the telltale during the automatic control mode. Further, in order to set said one air-conditioning factor to a desired value or a desired value, the operator must rotate the rotary control member watching the arrow on the rotary control member and the signs about it. This is troublesome.

SUMMARY OF THE INVENTION

In view of the foregoing observations and description, the primary object of the present invention is to provide an air-conditioning system which is free from the problems inherent to the known air-conditioning system described above.

Another object of the present invention is to provide an air-conditioning system in which the driver can easily set the rotary control member at a desired mode or a desired value of a air-conditioning factor without watching the rotary control member.

In accordance with the present invention the rotary member which is manually rotated to set one air-conditioning factor can be rotated endlessly. An angular position detecting means detects the angular position of the rotary member, a calculating means calculates the amount of rotation of the rotary member and the direction of rotation of the same when the rotary member is rotated from one angular position to another, and an air-conditioning factor setting means sets said one air-conditioning factor to a mode or a value which is determined on the basis of the amount and the direction of rotation of the rotary member and the mode or the value to which said one air-conditioning factor had been set when the rotary member was in said one angular position.

In the air-conditioning system in accordance with the present invention, when the rotary member is operated during the automatic control mode, the control mode is shifted to the manual control mode as far as the blow mode. In such a case, the air-conditioning factor controlled by the rotary member changes from the value or the mode to which the air-conditioning factor has been set during the automatic control mode. Accordingly, a desired value or mode can be easily selected without watching the telltales so long as the operator memorizes the changing order of the values or the modes of the air-conditioning factor.

Preferably the rotary member is not provided with any mark indicative of the angular position thereof. With this arrangement, the problem that the value or the mode of the air-conditioning factor indicated by the angular position of the rotary member differs from that actually set in the automatic control mode can be avoided.

DESCRIPTION OF THE PREFERRED EMBODIMENT

Figure 1:
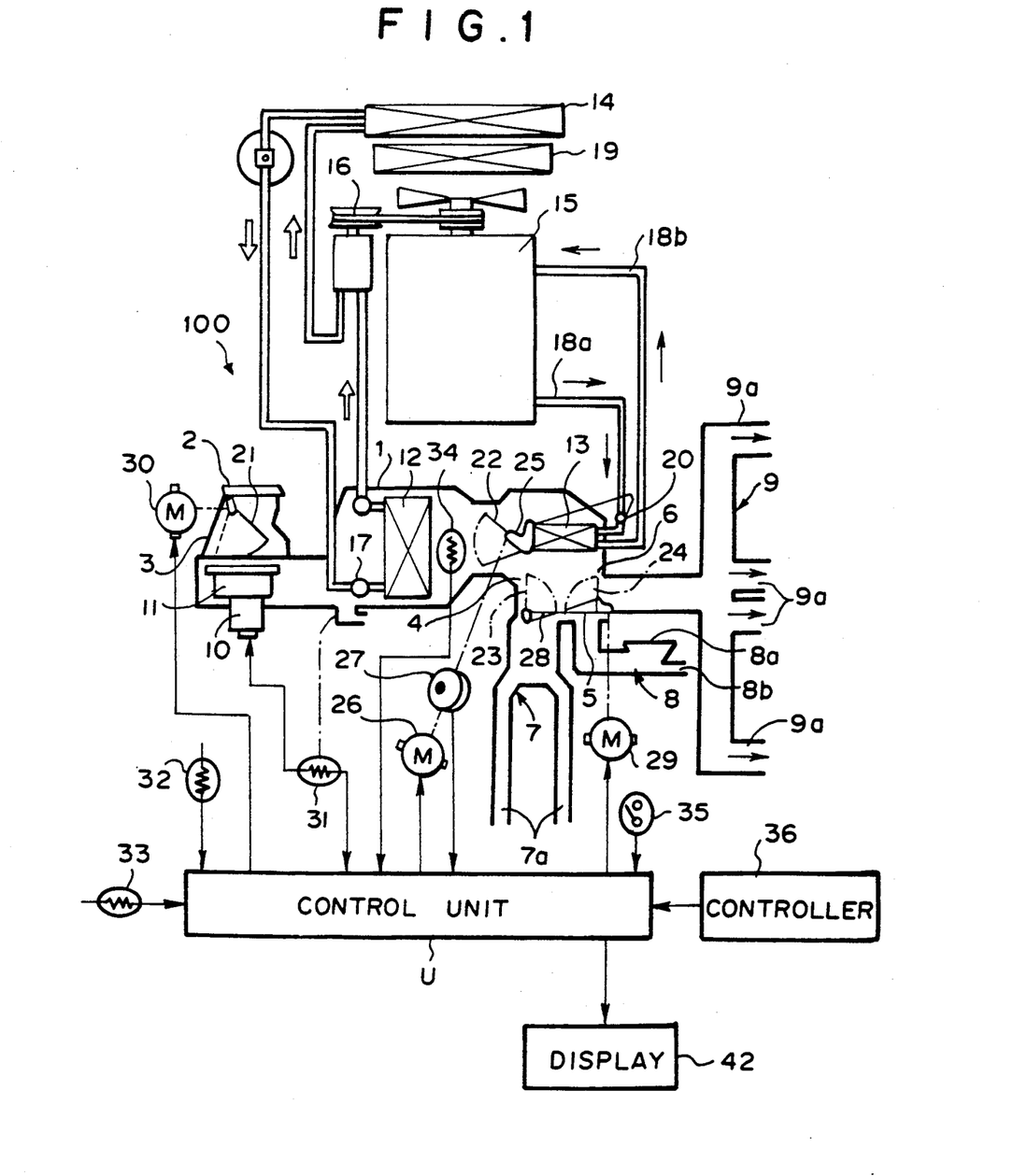
FIG. 1 is a schematic view showing an air-conditioning system for a vehicle in accordance with an embodiment of the present invention.

In FIG. 1, an air-conditioning system 100 in accordance with an embodiment of the present invention has a main duct 1, a heater duct 7, a defroster duct 8 and a vent duct 9 which form an air passage. The main duct 1 has an outside air intake 2 and an inside air intake 3 at its upstream end and first to third ports 4, 5 and 6 which respectively communicate with the heater duct 4, the defroster duct 8 and the vent duct 9.

The heater duct 7 has outlets 7a which open toward the floor in front of the front seats (not shown). The defroster duct 8 has a first outlet 8a extending along the lower edge of the windshield (not shown) and second outlets 8b disposed at the left and right ends of the instrument panel (not shown). The second outlets 8b of the defroster duct 8 opens toward the respective corners of the windshield. The vent duct 9 has a plurality of outlets 9a which open toward the faces of passengers on the front seats (not shown).

A blower 11, an evaporator 12 and a heater core 13 are disposed in side the main duct 1 in this order from the upstream end. The blower 11 is driven by an electric blower motor 10.

The evaporator 12 forms a refrigerating circuit together with a condenser 14, a compressor 16 (mechanically driven by an engine 15), an expansion valve 17 and the like. Refrigerant circulates as shown by arrows.

The heater core 13 is connected to the engine cooling system through an upstream side pipe 18a and a downstream side pipe 18b and the engine coolant flows into the heater core through the upstream side pipe 18a and returns to the engine 15 through the downstream side pipe 18b as shown by the arrows. The amount of the engine coolant flowing through the heater core 13 is controlled by a flow control valve 20 provided in the upstream side pipe 18a. Reference numeral 19 denotes a radiator.

An inside-outside air door 21, an air mixing door 22, a first mode door 23 and a second mode door 24 are provided in the main duct 1.

The inside-outside air door 21 is disposed between the outside air intake 2 and the inside air intake 3 and controls the proportion of the amount of outside air to that of inside air taken in through the respective intakes 2 and 3. The air mixing door 22 is disposed between the evaporator 12 and the heater core 13 and controls the proportion of the amount of air which flows through the heater core 13 to that of air which bypasses the heater core 13. (conditioning air temperature control) The air mixing door 22 is connected to the flow control valve 20 by way of a bell-crank 55 which is connected to an electric motor 26, whereby the air mixing door 22 is opened and closed and the opening of the flow control valve 20 is controlled by the electric motor 26. The amount of rotation of the electric motor 26 which governs the opening of the air mixing door 22 is detected by a potentiometer 27.

The first mode door 23 is disposed at the upstream end of the heater duct 7. The second mode door 24 is disposed between upstream ends of the defroster duct 8 and the vent duct 9. The proportion of the amounts of conditioning air led to the heater duct 7, the defroster duct 8 and the vent duct 9 is controlled by the first and second mode doors 23 and 24. (switching of the blowing mode)

Figure 2:
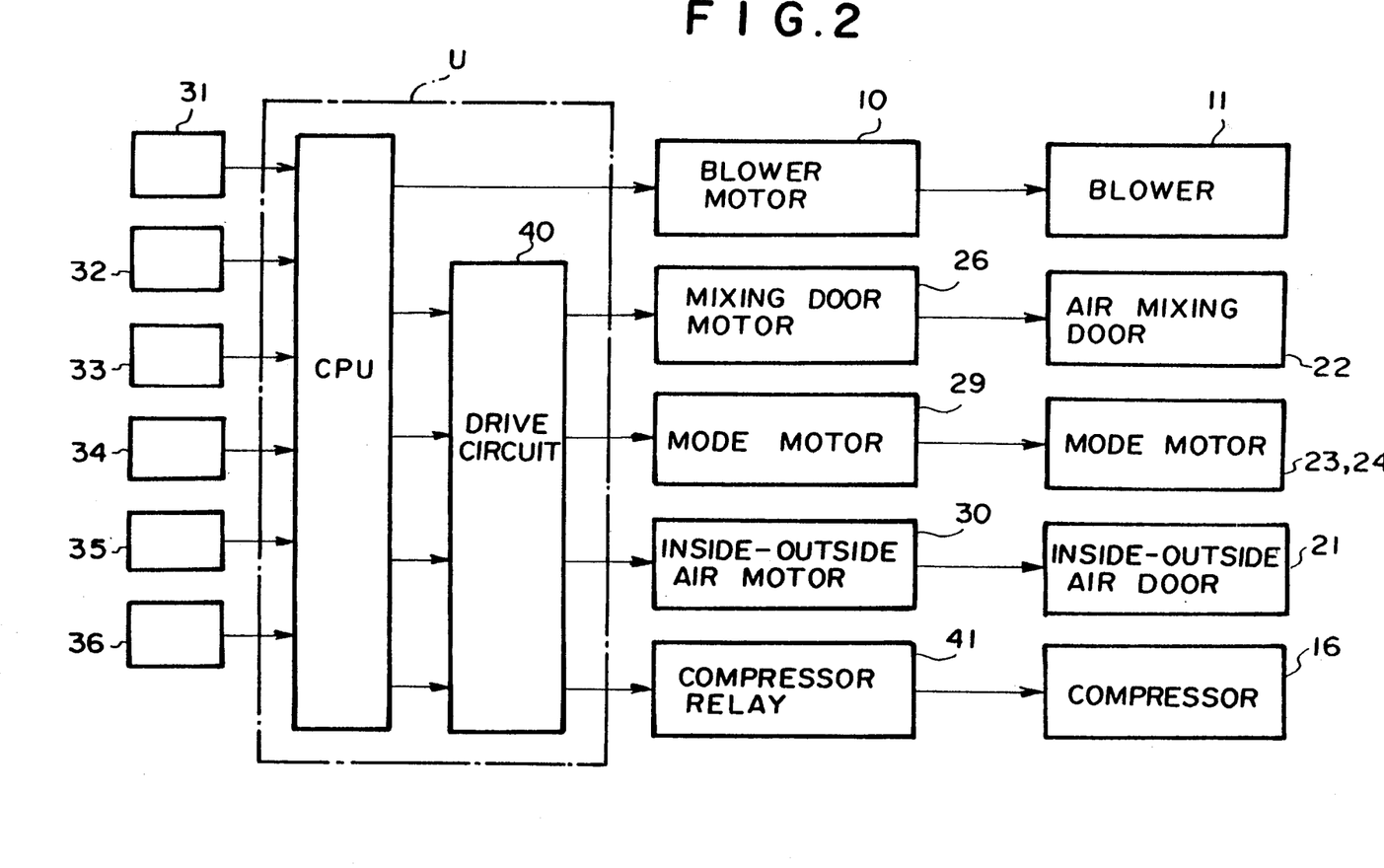
FIG. 2 is a view showing a control system of the air-conditioning system.

Reference character U in FIGS. 1 and 2 denotes a control unit which may comprise a microcomputer. The control unit U includes a CPU, a ROM, a RAM and the like.

Signals from a room temperature sensor 31 which detects the temperature in the interior of the vehicle, an ambient temperature sensor 32 which detects the temperature outside the vehicle, a solar radiation sensor 33 which detects the solar radiation entering the vehicle interior, a duct sensor 34 which is disposed in the main duct 1 downstream of the evaporator 12 and detects the temperature of air after passing through the evaporator 12 and an coolant temperature switch 35 which detects the temperature of the engine coolant are input into the control unit U.

Figure 3:
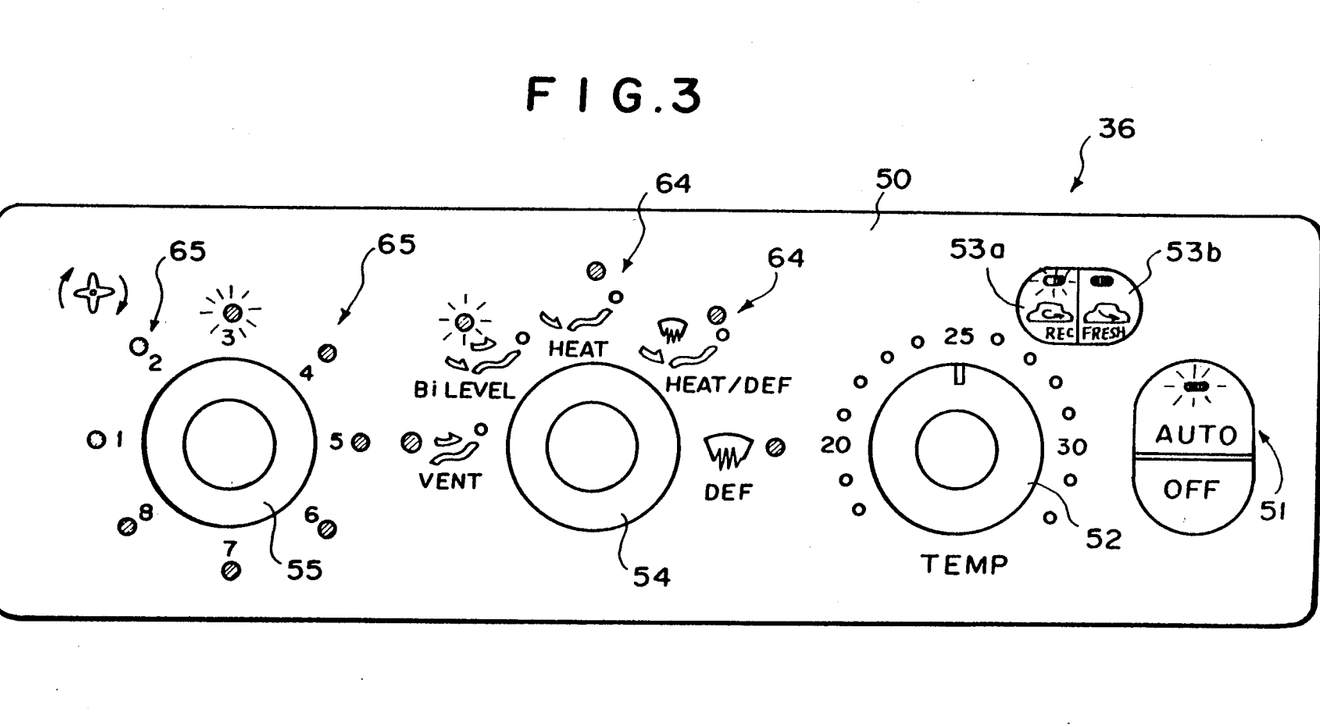
FIG. 3 is a front view showing the control panel of the controller of the air-conditioning system.

The control unit U further receives signals from a controller 36. As shown in FIG. 3, the controller 36 has a control panel 50 on which an auto-switch 51 is provided. Further a temperature control dial 52, a recirculation selection switch 53a, an outside air selection switch 53b, a blow mode control dial 54 and a blower control dial 55 are provided on the control panel 50 as manual control members.

When the auto-switch 51 is turned on, the air-conditioning system 100 automatically operates and when it is turned off, the air-conditioning system 100 operates under manual control.

By operating the temperature control dial 52, the desired temperature can be set by the degree in the range of 18° to 32°. When the recirculation selection switch 53a is pushed down, inside air recirculates and when the outside air selection switch 53b is pushed down, outside air enters. At the same, the selection switches 53a and 53b function as a main switch.

By rotating the blow mode control dial 54, a desired blow mode can be manually selected even during the automatic control of the air-conditioning system 100. The blow mode control dial 54 can be endlessly rotated and the blow mode is set according to the amount of rotation of the blow mode control dial 54. The blow mode control dial 54 is not provided with any mark indicative of the angular position thereof or the blow mode selected.

Figure 4:
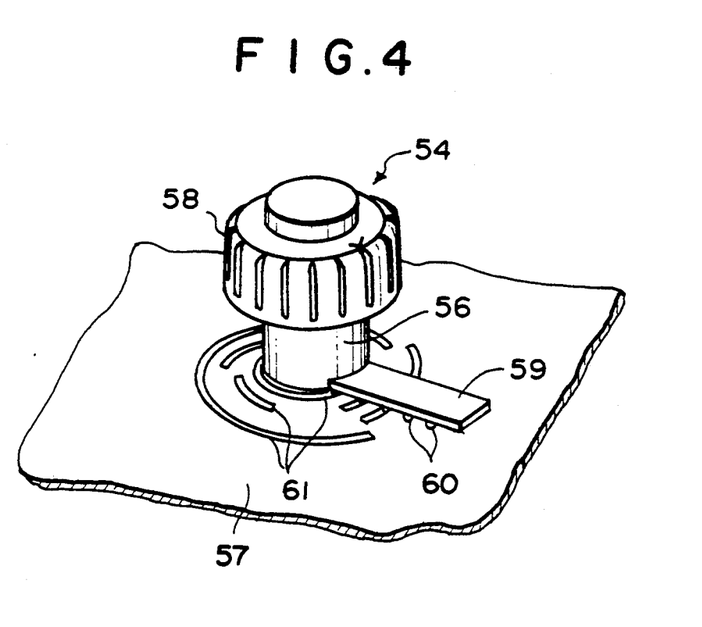
FIG. 4 is a perspective view showing the structure of the blow mode control dial.

That is, the blow mode control dial 54 has a rotational shaft 56 as shown in FIG. 4, and the rotational shaft 56 extends through the control panel 50 and is supported for rotation on a substrate 57 behind the control panel 50. A knob 58 is provided on the upper end of the rotational shaft 56 and a conductive brush holder 59 is mounted on the lower end of the rotational shaft 56. A plurality of brushes 60 are provided on the lower surface of the brush holder 59 at regular intervals in a diametrical direction of the rotational shaft 56. As the knob 58 is rotated, the brushes 60 slide on the substrate 57. A plurality of fixed terminals 61 are printed on the substrate 57 to contact with one of the brushes as the knob 58 is rotated. The combinations of the fixed terminals 61 form form bit patterns at regular intervals in the circumferential direction. When the knob 58 is rotated while an electric voltage is applied to the brushes 60 and the fixed terminals 61, a plurality of bit signals are obtained according to occurrence of voltage drop ('0', '1' signals) as blow mode signals.

In this particular embodiment, eight 4-bit signals are obtained and five of them are used as a VENT signal, BI-LEVEL signal, a HEAT signal, a DEF/HEAT signal and a DEF signal in this order in the direction of rotation of the blow mode control dial 54.

Though, in this particular embodiment, the telltales 64 are disposed about the blow mode control dial 54, they may be disposed at other places.

Also the blower control dial 55 can be endlessly rotated and the rotational speed of the blower motor 10 is changed in eight speeds by rotation of the blower control dial 55. The blower control dial 55 is not provided with any mark indicative of the angular position thereof or the speed of the blower motor 10 selected. The speed of the blower motor 10 selected is indicated by telltales 65. The blower control dial 55 may be similar to the blow mode control dial 54 in structure and accordingly the structure of the blower control dial 55 will not be described here.

The control unit U outputs control signals to the motor 26 for the air mixing door 22 (to be referred to as the "first motor 26", hereinbelow), a second motor 29 for the first and second mode doors 23 and 24, a third motor 30 for the inside-outside air door 21 and a relay 41 for the compressor 26 by way of a drive circuit 40 as shown in FIG. 2. The control signals and the desired room temperature are input into a display 42 (FIG. 1) provided on an instrument panel and the flow rate of air and the like are shown by the display 42.

The control of the blow mode by the control unit U will be described by way of an example.

When the auto-switch 51 is turned on, the control of the air-conditioning system 100 is shifted to the automatic control mode and the air-conditioning state is automatically controlled. The air-conditioning state which is automatically selected is indicated by the telltale 64 independently from the telltale terminal 62 in contact with the brush 63 at that time. In this case, since the blow mode control dial 54 is not provided with any mark indicative of the blow mode automatically selected, there does not arise a problem that the position of the blow mode control dial 54 is incompatible with the lighted telltale 64.

When the auto-switch 51 is off, a controlling condition is set based on the blow mode manually set by the controller 36 and a control signal representing the controlling condition is output. (manual control mode) The telltale 64 corresponding to the blow mode selected is lit.

When the blow mode control dial 54 is operated during the automatic control mode, the control mode is shifted to the manual control mode as far as the blow mode. In such a case, the blow mode is shifted to the mode which is determined based on the blow mode which has been selected in the automatic control mode and the amount of rotation of the blow mode control dial 54. For example when the HEAT mode has been selected in the automatic control mode and the blow mode control dial 54 is counterclockwisely rotated by an angle corresponding to one interval between the bit patterns, the blow mode is shifted to the BI LEVEL mode.

Accordingly, when the blow mode is manually selected while the air-conditioning system 100 is being automatically controlled, a desired blow mode can be easily selected without watching the telltales 64 so long as the operator memorizes the changing order of the blow modes. If desired in view of simplification of the system, the telltales 64 can be omitted.

Similar control is effected on the blower control.

Figure 5:
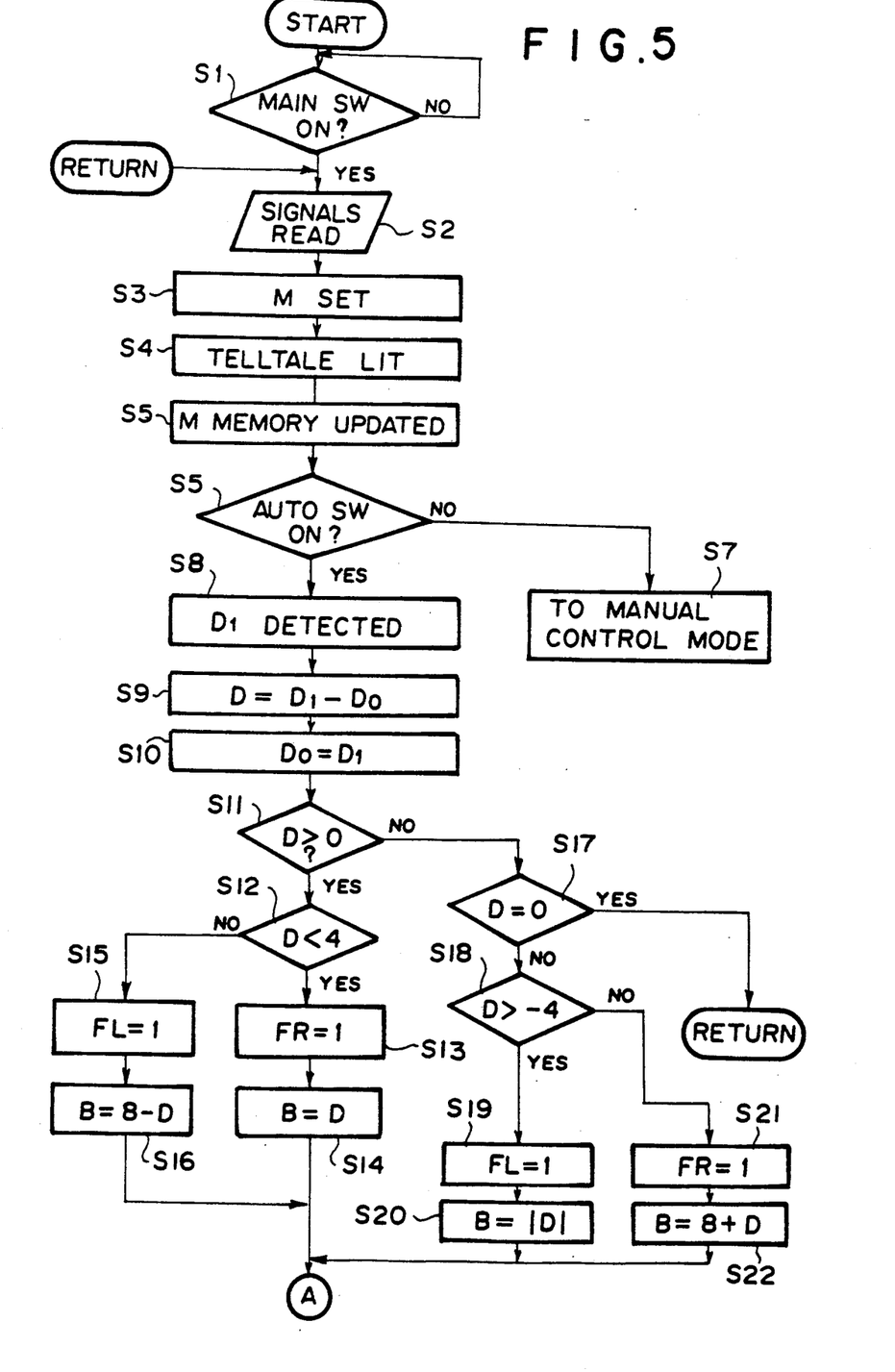
FIGS. 5 to 7 are parts of a flow chart for illustrating the operation of the control unit.
Figure 6:
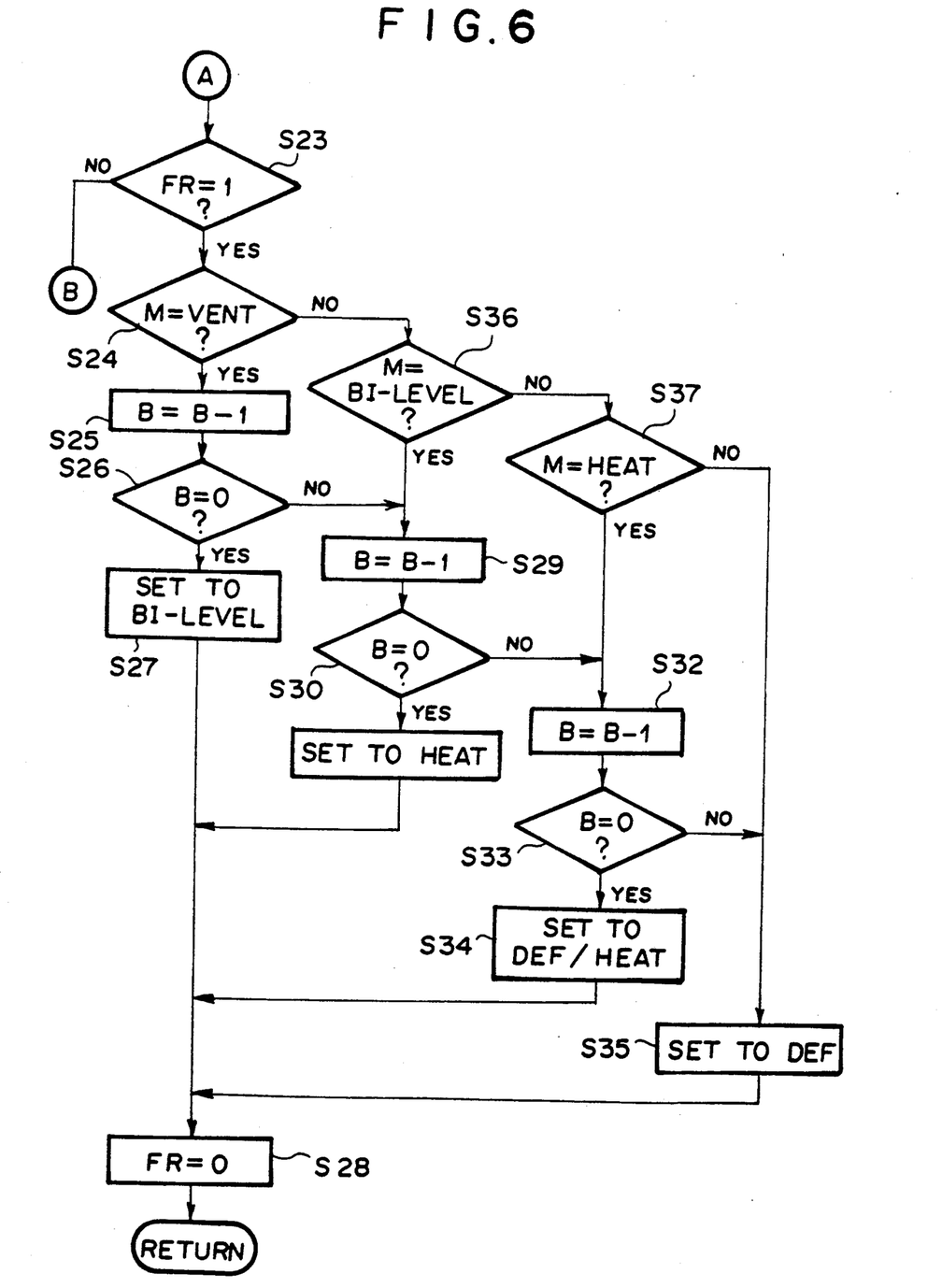
Figure 7:
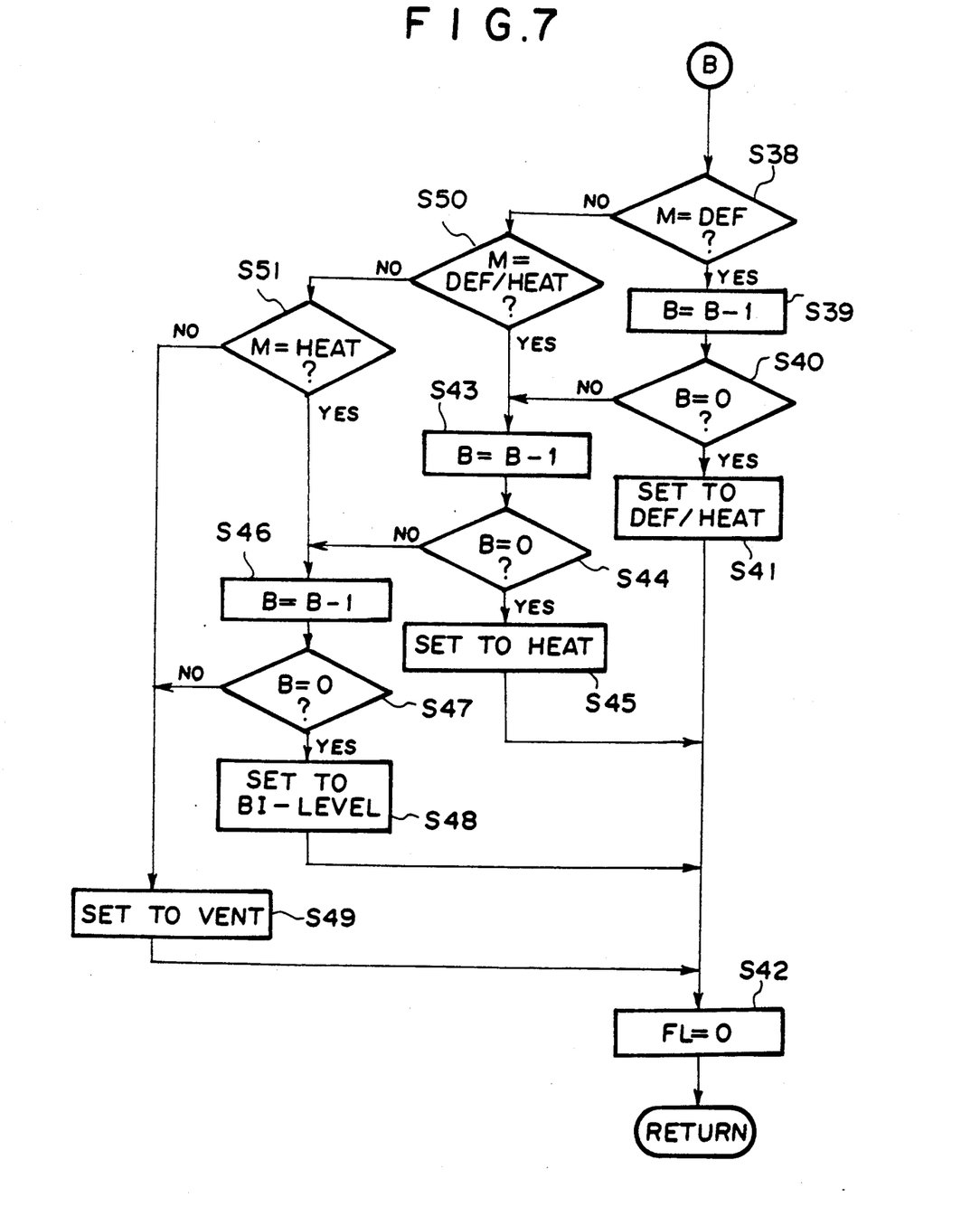

The control described above will be described in more detail with reference to the flow charts shown in FIGS. 5 to 7, hereinbelow.

When the main switch is on, that is, when either of the recirculation selection switch 53a and the outside air selection switch 53b has been depressed, the control unit U reads the signals and sets the blow mode M. (steps S1 to S3) Then the control unit U lights the telltale 64 corresponding to the blow mode which the control unit U has set in step S2 and stores it in place of the blow mode M which was set last. (steps S4 and S5)

Then the control unit U determines whether the auto-switch 51 has been depressed and when it is determined that the auto-switch 51 has not been depressed, the control unit U effects the manual control (steps S6 and S7) Otherwise, the control unit U detects the angular position D1 of the blow mode control dial 54 at that time. (step 8) In this particular embodiment, the angular position of the blow mode control dial 54 is represented by a number in the range of 1 to 8 since there are provided eighth bit patterns around the blow mode control dial 54 as described above. Then the control unit U calculates the difference D between the number representing the angular position D1 of the blow mode control dial 54 at that time and the number representing the angular position Do of the blow mode control dial 54 detected last (to be referred to as "the last angular position Do", hereinbelow). (step S9) The control unit U updates the last angular position Do in step S10.

Then the control unit U determines in step S11 whether the difference D is positive. When it is determined that the difference D is positive, the control unit U further determines in step S12 whether the difference D is smaller than 4, which is a reference value determined on the assumption that it is impossible to rotate the blow mode control dial 54 by an angle larger than 180°. When it is determined that the difference D is smaller than 4, the control unit U determines that the blow mode control dial 54 was rotated right (in the clockwise direction) and sets right rotation flag FR to 1. (step S13) Then the control unit U sets the amount of rotation B of the blow mode control dial 54 to D in step S14. On the hand, when it is determined in step S12 that the difference D is not smaller than 4, the control unit U determines that the blow mode control dial 54 was rotated left (in the counterclockwise direction) and sets left rotation flag FL to 1. (step S15) Then the control unit U sets the amount of rotation B of the blow mode control dial 54 to 8-D in step S16.

When it is determined in step S11 that the difference D is not positive, the control unit U determines in step S17 whether the difference D is 0. When it is determined that the difference D is 0, which is the case when the auto-switch 51 is turned off or when the blow mode control dial 54 is once rotated and then returned to the original position, the control unit U returns to step S2. When it is determined in step S17 that the difference D is not 0, the control unit U further determines in step S18 whether the difference D is larger than −4. When it is determined that the difference D is larger than −4, the control unit U determines that the blow mode control dial 54 was rotated left and sets left rotation flag FL to 1. (step S19) Then the control unit U sets the amount of rotation B of the blow mode control dial 54 to |D| in step S20. On the hand, when it is determined in step S18 that the difference D is not larger than −4, the control unit U determines that the blow mode control dial 54 was rotated right and sets right rotation flag FR to 1. (step S21) Then the control unit U sets the amount of rotation B of the blow mode control dial 54 to 8+D in step S22.

Thereafter the control unit U determines in step S23 whether the right rotation flag FR has been set to 1. When it is determined that the right rotation flag FR has been set to 1, the control unit U determines in step S24 whether the blow mode M set in step S4 was the VENT mode. When it is determined that the blow mode M set in step S4 was the VENT mode, the control unit U sets the amount of rotation B to the value obtained by subtracting 1 from the value determined in step S14 or S22. (step S25) Then the control unit U determines in step S26 whether the amount of rotation B set in step S25 is 0. When it is determined that the amount of rotation B set in step S25 is 0, the control unit U sets the blow mode to BI-LEVEL and lights the telltale 64 corresponding to BI-LEVEL since the blow mode control dial 54 was rotated by "1" from VENT. (step S27) Thereafter the control unit U resets the right rotation flag FR to 0 in step S28.

When the answer to the question in step S26 is NO, the control unit U further subtracts 1 by 1 from the amount of rotation B set in step S25 until the remainder becomes 0. When the remainder becomes 0 by once subtracting 1, the control unit U determines that the blow mode control dial 54 was rotated by "2", from the VENT and sets the blow mode to HEAT while lighting the telltale 64 corresponding to HEAT. When the remainder becomes 0 by twice subtracting 1, the control unit U determines that the blow mode control dial 54 was rotated by "3" from the VENT and sets the blow mode to DEF/HEAT while lighting the telltale 64 corresponding to DEF/HEAT. Further when the remainder does not become 0 after twice subtracting 1, the control unit U immediately sets the blow mode to DEF while lighting the telltale 64 corresponding to DEF. (steps S29 to S35) In view of the fact that the blow mode control dial 54 rotates endlessly, the blow mode is set to DEF when the blow mode control dial 54 is rotated by more than "4" from VENT in this particular embodiment.

When it is determined in step S24 that the blow mode M set in step S4 was not the VENT mode, the control unit U determines in step S36 whether the blow mode M set in step S4 was the BI-LEVEL mode. When the answer to the question in step S36 is YES, the control unit U proceeds to step S29 and performs steps S29 to S35 and then proceeds to step S28. Otherwise the control unit U proceeds to step S37 and determines whether the blow mode M set in step S4 was the HEAT mode. When the answer to the question in step S37 is YES, the control unit U proceeds to step S32 and performs steps S32 to S35 and then proceeds to step S28. Otherwise the control unit U proceeds to step S35 and then to step S28. When the answer to the question in step S37 is NO, the blow mode M set in step S4 was the DEF/HEAT or the DEF mode and even if the blow mode control dial 54 is rotated right from DEF/HEAT of DEF by an amount smaller than "4", the blow mode is kept set to DEF.

When the answer to the question in step S23 is NO, that is, the left rotation flag FL has been set to 1, the control unit U proceeds to step S38. In step S38, the control unit U determines whether the blow mode M set in step S4 was the DEF mode. When it is determined that the blow mode M set in step S4 was the DEF mode, the control unit U sets the amount of rotation B to the value obtained by subtracting 1 from the value determined in step S16 or S20. (step S39) Then the control unit U determines in step S40 whether the amount of rotation B set in step S39 is 0. When it is determined that the amount of rotation B set in step S39 is 0, the control unit U sets the blow mode to DEF/HEAT and lights the telltale 64 corresponding to DEF/HEAT since the blow mode control dial 54 was rotated by "1" from DEF. (step S41) Thereafter the control unit U resets the left rotation flag FL to 0 in step S42.

When the answer to the question in step S40 is NO, the control unit U further subtracts 1 by 1 from the amount of rotation B set in step S39 until the remainder becomes 0. When the remainder becomes 0 by once subtracting 1, the control unit U determines that the blow mode control dial 54 was rotated by "2" from DEF and sets the blow mode to HEAT while lighting the telltale 64 corresponding to HEAT. When the remainder becomes 0 by twice subtracting 1, the control unit U determines that the blow mode control dial 54 was rotated by "3" from the DEF and sets the blow mode to BI-LEVEL while lighting the telltale 64 corresponding to BI-LEVEL. Further when the remainder does not become 0 after twice subtracting 1, the control unit U immediately sets the blow mode to VENT while lighting the telltale 64 corresponding to VENT. (steps S43 to S49) In view of the fact that the blow mode control dial 54 rotates endlessly, the blow mode is set to VENT when the blow mode control dial 54 is rotated by more than "4" from DEF in this particular embodiment.

When it is determined in step S38 that the blow mode M set in step S4 was not the DEF mode, the control unit U determines in step S50 whether the blow mode M set in step S4 was the DEF/HEAT mode. When the answer to the question in step S50 is YES, the control unit U proceeds to step S43 and performs steps S43 to S49 and then proceeds to step S42. Otherwise the control unit U proceeds to step S51 and determines whether the blow mode M set in step S4 was the HEAT mode. When the answer to the question in step S51 is YES, the control unit U proceeds to step S46 and performs steps S46 to S49 and then proceeds to step S42. Otherwise the control unit U proceeds to step S49 and then to step S42. When the answer to the question in step S51 is NO, the blow mode M set in step S4 was the VENT mode and even if the blow mode control dial 54 is rotated left from DEF by an amount smaller than "4", the blow mode is kept set to VENT.

What is claimed is:

1. An air-conditioning system for a vehicle comprising a control means which controls the air-conditioning system either in an automatic control mode in which the control means automatically sets a plurality of air-conditioning factors such as the speed of a blower motor, the blow mode and the like and controls the air-conditioning system according to the air-conditioning factors automatically set or in a manual control mode in which the air-conditioning factors are manually set and the control means controls the air-conditioning system according to the air-conditioning factors which are manually set, an auto-switch which is turned on to cause the control means to control the air-conditioning system in the automatic control mode and is turned off to cause the control means to control the air-conditioning system in the manual control mode, a rotary member which can be rotated endlessly and is manually rotated to set one of said air-conditioning factors when the auto-switch is off, an angular position detecting means which detects the angular position of the rotary member and stores it, a memory means which stores the value or the mode to which said one air-conditioning factor is set, a calculating means which calculates the amount of rotation of the rotary member and the direction of rotation of the same when the rotary member is rotated from one angular position to another, and an air-conditioning factor setting means which sets said one air-conditioning factor to a mode or a value which is determined on the basis of the amount and the direction of rotation of the rotary member and the mode or the value to which said one air-conditioning factor had been set when the rotary member was in said one angular position.

2. An air-conditioning system as defined in claim 1 in which rotation of the rotary member when the auto-switch is on causes the control means to control the air-conditioning system in the manual control mode as far as said one air-conditioning factor.

3. An air-conditioning system as defined in claim 2 in which said rotary member is not provided with any mark indicative of the angular position thereof.

4. An air-conditioning system as defined in claim 3 in which a means for indicating the mode or the value to which said one air-conditioning factor is set is provided in the vicinity of the rotary member.

5. An air-conditioning system as defined in claim 1 in which said one air-conditioning factor is the blow mode.

* * * * *